United States Patent [19]

Bridgewater et al.

[11] Patent Number: 4,527,986
[45] Date of Patent: Jul. 9, 1985

[54] RESILIENT ANTI-BACKLASH SHAFT COUPLING

[75] Inventors: Bobbie D. Bridgewater; Robert E. Young, both of Anderson, Ind.

[73] Assignee: General Motors Corporation, Detroit, Mich.

[21] Appl. No.: 534,796

[22] Filed: Sep. 22, 1983

[51] Int. Cl.³ .............................. F16D 3/52; F02P 7/00
[52] U.S. Cl. ...................................... 464/73; 403/339; 464/101
[58] Field of Search ............... 123/146.5 A; 403/339, 403/340, 372, 380; 464/73, 76, 100, 101, 147, 149

[56] References Cited

U.S. PATENT DOCUMENTS

| | | | |
|---|---|---|---|
| 783,882 | 2/1905 | Mershon | 464/149 |
| 925,250 | 6/1909 | Villiers-Stuart | 464/82 X |
| 1,272,061 | 7/1918 | Lake | 464/74 X |
| 1,769,107 | 7/1930 | Brown | 464/102 |
| 1,827,176 | 10/1931 | Thomas | 464/82 |
| 1,857,679 | 5/1932 | Thomas | 464/82 |
| 1,963,187 | 6/1934 | Wood | 464/74 X |
| 2,004,077 | 6/1935 | McCartney et al. | 464/76 |
| 2,724,251 | 11/1955 | Weaver | 464/101 |
| 2,860,497 | 11/1958 | Parks | 464/100 |
| 3,246,484 | 4/1966 | Haddad et al. | 464/76 X |
| 3,286,489 | 11/1966 | Turro | 464/101 |
| 3,345,831 | 10/1967 | Boole | 464/74 |
| 3,473,349 | 10/1969 | Tateyama | 464/101 |
| 3,475,923 | 11/1969 | Spence | 464/76 |
| 4,392,635 | 7/1983 | Muessel et al. | 464/147 X |
| 4,403,579 | 9/1983 | Young et al. | 123/146.5 A |

FOREIGN PATENT DOCUMENTS

| | | | |
|---|---|---|---|
| 2247460 | 4/1973 | Fed. Rep. of Germany | 464/76 |
| 783774 | 7/1935 | France | 464/76 |

Primary Examiner—Stuart S. Levy
Assistant Examiner—Daniel P. Stodola
Attorney, Agent, or Firm—C. R. Meland

[57] ABSTRACT

A coupling for connecting the end of the camshaft of an internal combustion engine to the drive shaft of an ignition distributor. The coupling comprises a drive coupling member that is fixed to the drive shaft of the ignition distributor. The coupling member has a pair of axially extending lugs that have surfaces that engage surfaces formed on a pair of lugs that extend axially from the end of the camshaft. A spring member is fixed to the coupling member which has a pair of curved spring portions that engage other surfaces on the camshaft lugs and which serve to prevent backlash between the shafts.

4 Claims, 4 Drawing Figures

RESILIENT ANTI-BACKLASH SHAFT COUPLING

This invention relates to anti-backlash shaft couplings and more particularly to an anti-backlash coupling for connecting the camshaft of an internal combustion engine to the drive shaft of an ignition distributor.

When the distributor of an ignition distributor is driven from the end of the camshaft of an internal combustion engine a coupling device must be provided to transmit torque from the camshaft of the engine to the drive shaft of the distributor. In such an arrangement it is important to substantially eliminate backlash. Thus, the ignition distributor controls the ignition timing for the engine as a function of camshaft angular position and accordingly ignition timing will not be properly related to camshaft angular position if the coupling permits backlash. It accordingly is a general object of this invention to provide a shaft coupling for connecting an engine camshaft and the drive shaft of an ignition distributor that provides substantially zero backlash between the shafts and yet is capable of accommodating shaft misalignment and manufacturing tolerances.

A more specific object of this invention is to provide a coupling for connecting the camshaft of an engine to a distributor drive shaft which includes a coupling member which is secured to the distributor drive shaft. This coupling member has a pair of lugs and a spring member is attached to the coupling member that has a pair of curved spring portions. The camshaft has a pair of axially extending lugs that provide drive walls that engage surfaces or walls on the lugs of the coupling member. The lugs on the camshaft have other surfaces which tightly engage the curved portions of the spring member and the spring member is arranged to takeup any clearance between the engaged surfaces on the lugs of the coupling member and the camshaft.

A further object of this invention is to provide a coupling member of the type described which is polarized, that is, it is arranged such that the camshaft and coupling member can only be axially assembled when they are in a certain relative angular relationship.

In the drawings

Figure 1:
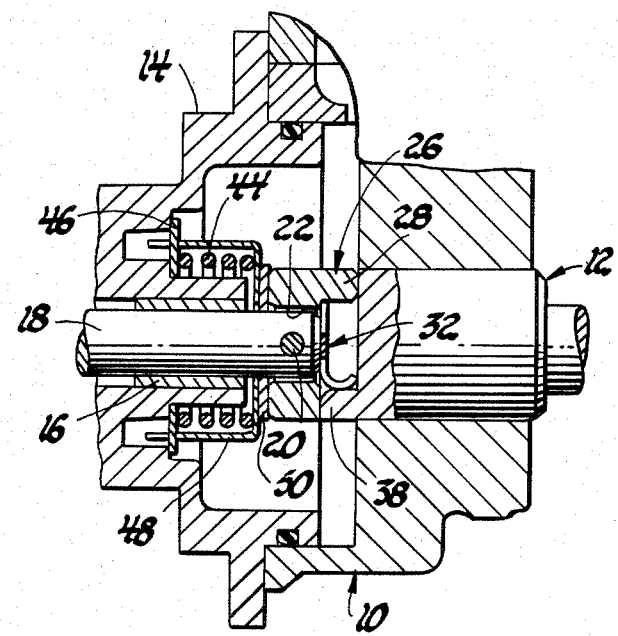
FIG. 1 is a sectional view with parts broken away illustrating the coupling member of this invention connecting the camshaft of an engine and an ignition distributor drive shaft.

Referring now to the drawings and more particularly to FIG. 1, the reference numeral 10 designates a housing of an internal combustion engine. Disposed within the housing 10 is an engine camshaft designated by reference numeral 12. An ignition distributor housing designated by reference numeral 14 is secured to the engine housing 10 by bolts which are not illustrated. The housing 14 supports a bearing 16 which in turn rotatably supports an ignition distributor shaft 18. The ignition distributor shaft drives ignition distributor apparatus which may be, for example, of the type disclosed in U.S. Pat. No. 3,923,038, to Campbell et al. As shown in that patent the distributor has another upper bearing for rotatably supporting the distributor shaft 18. One end of the distributor shaft has a hole which receives a drive pin 20. This end of the shaft is located in an opening or hole 22 formed in a coupling member that is generally designated by reference numeral 26. The coupling member 26 is formed of a metallic material such as steel. The coupling member 26 has aligned radially extending holes 27 and when these holes are aligned with the hole in the distributor shaft 18 the drive pin 20 is forced into the holes (press fit) to thereby mechanically connect the coupling member 26 to the shaft 18.

Figure 2:
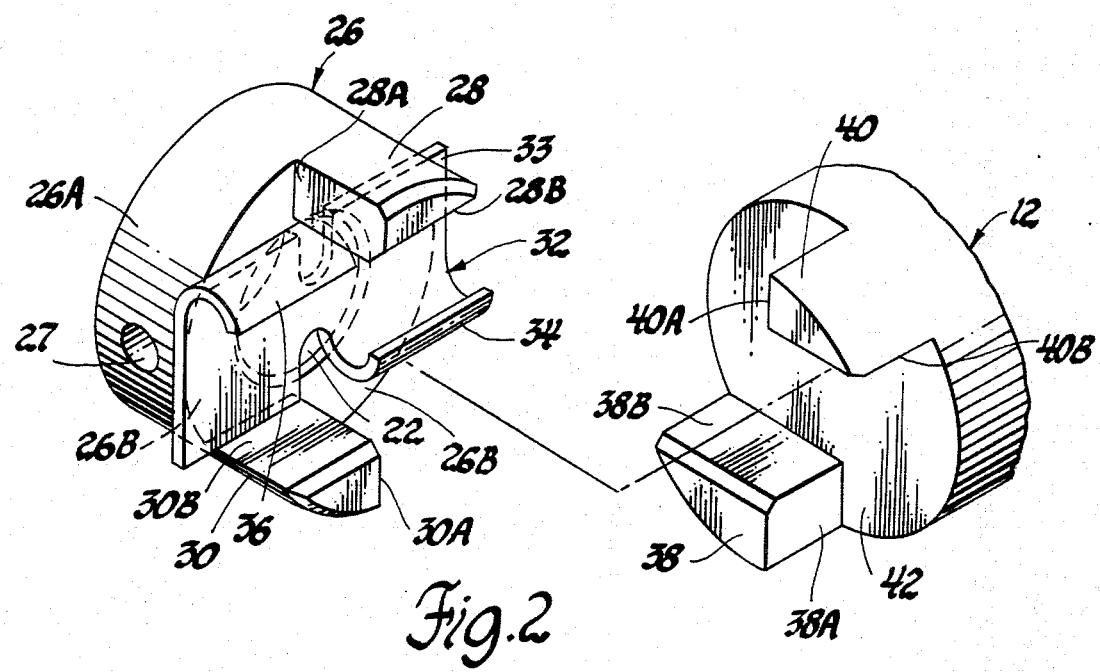
FIG. 2 is a perspective view illustrating the end of the camshaft and the coupling member that is secured to the distributor drive shaft.
Figure 3:
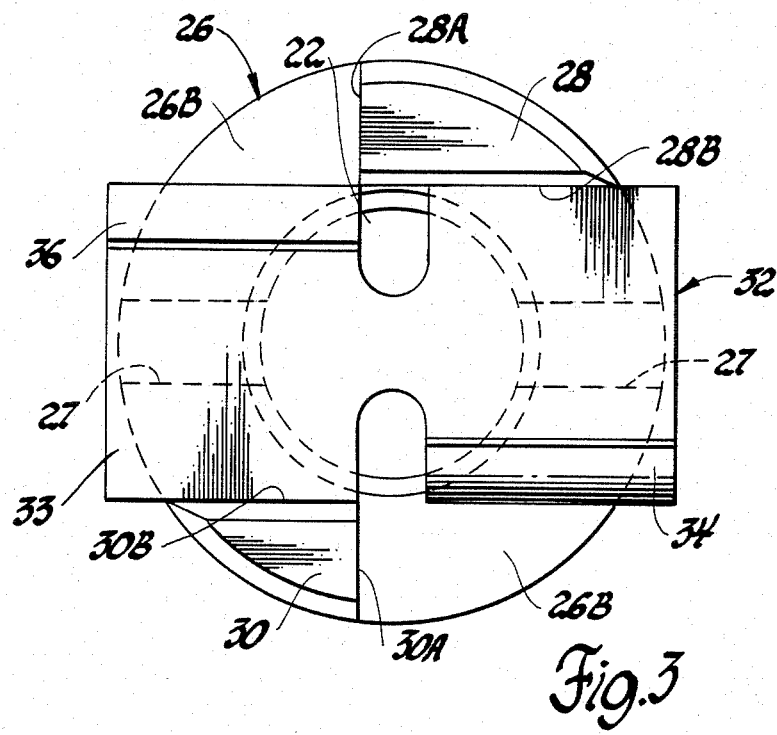
FIG. 3 is an end view of the coupling member that is connected to the distributor drive shaft.
Figure 4:
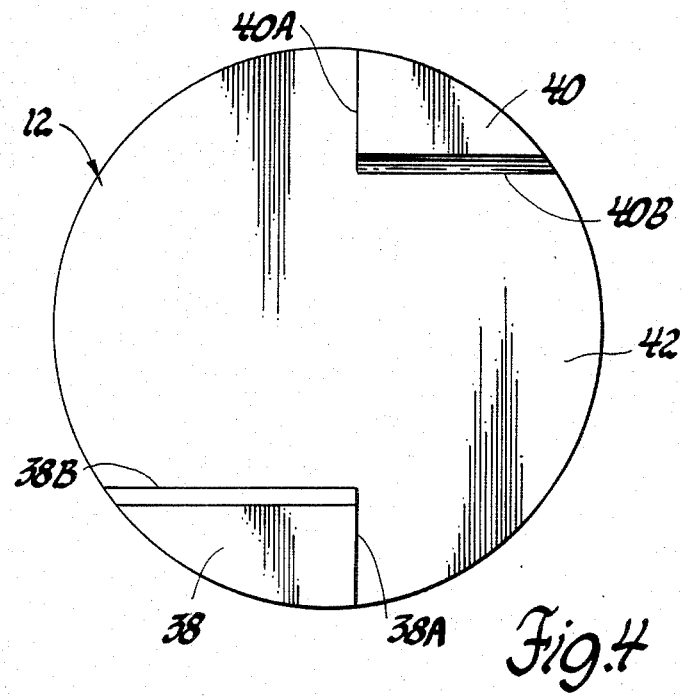
FIG. 4 is an end view of the engine camshaft.

The coupling member 26 is best shown in the perspective view of FIG. 2 and in FIG. 3 which is an end view of the coupling member 26. The coupling member 26 has an annular base portion 26A and a flat radially extending wall or surface 26B. Extending axially from the surface 26B are a pair of projections or lugs 28 and 30. The outer surfaces of the lugs 28 and 30 have the same annular shape as the base portion 26A. The lug 28 has a pair of surfaces or walls 28A and 28B which are located substantially normal to each other. The lug 30 likewise has a pair of surfaces or walls 30A and 30B which are located substantially normal to each other. The surfaces 28A and 30A are substantially parallel as are the surfaces 28B and 30B. The surface 28B is longer than the surface 30B as can be seen from FIGS. 2 and 3.

The coupling member 26 further includes a spring member generally designated by reference numeral 32 which is formed of a spring steel material. This spring member has a flat base portion 33 which is welded to surface 26B and has a pair of integral curved portions 34 and 36.

The end of the engine camshaft 12, that faces the distributor, has a pair of projections or lugs designated respectively by reference numerals 38 and 40 which extend axially from a surface 42. The lug 38 has a pair of surfaces or walls 38A and 38B which are located substantially normal to each other. The lug 40 likewise has a pair of surfaces or walls 40A and 40B which are located substantially normal to each other. The surfaces 38A and 40A are substantially parallel as are the surfaces 38B and 40B. The surface 38B is longer than surface 40B.

The coupling member 26 is urged to the right in FIG. 1 by a compression spring 44 which is compressed between a part 46 and a spring retainer part 48. The part 48 engages a washer 50 which in turn engages coupling member 26 and the part 48 has arms located within recesses formed in the distributor housing 14 to prevent rotation of the part 48. This device, for urging the distributor shaft 18 and the coupling part 26 to the right in FIG. 1, is known to those skilled in the art.

When it is desired to assemble the distributor to the engine the end of distributor housing 14 is bolted to the engine housing 10. The shaft 18 is then rotated until the lugs 28 and 30 reach such a position that surface 38B can engage the outer wall of the curved portion 34 of spring 32 and surface 40B can engage the outer wall of the curved portion 36 of the spring. In this position surfaces 38A and 30A can be engaged and surfaces 40A and 28A can be engaged when the coupling 26 and shaft 18 move axially to the right in FIG. 1 and into mesh with end of the camshaft. The space or distance between parallel walls 38B and 40B is such that when the coupling part 26 is axially assembled to the end of camshaft 12 the curved portions 34 and 36 of the spring are bowed in slightly. When the coupling part is assembled to the end of the camshaft 12 the curved spring portions 34 and 36 will now provide a reactive force to cause the surfaces 38A and 30A and 40A and 28A to be tightly engaged. Thus, the spring portions 34 and 36 will takeup any space between the surfaces that might be due to manufacturing tolerances.

When the engine is running and the camshaft is driving the distributor shaft the camshaft rotates in such a direction that surfaces 38A and 40A engage surfaces 30A and 28A and surfaces 38A and 40A apply a driving force to surfaces 30A and 28A of coupling member 26A. In other words, distributor shaft driving force is transmitted from surfaces 38A and 40A to surfaces 30A and 28A. The coupling member 26 is held meshed with the end of the crankshaft by spring 44. Backlash between the camshaft and distributor shaft is substantially prevented since spring portions 34 and 36 tend to maintain the mating surfaces of the camshaft and coupling member engaged by a predetermined preload that is dependent upon the force developed by spring portions 34 and 36. Thus, any tendency of the surfaces 38A and 40A to become separated from surfaces 30A and 28A is opposed by the reactive spring forces developed in spring portions 34 and 36.

The coupling device of this invention is polarized, that is the camshaft and coupling member 26 cannot be axially assembled together until the camshaft and coupling member are positioned in one certain relative angular relationship. This polarizing feature is due to the fact that surfaces 28B and 30B are not of equal length and surfaces 38B and 40B are also not of equal length. Had these surfaces all been made the same length so that the lugs on the camshaft and on coupling member were identical there would be two positions 180° apart in which the camshaft and coupling member could be assembled instead of only one position provided by this invention.

The relative axial lengths of lugs 28 and 30 and 38 and 40 can be such that surface 42 engages the end surfaces of lugs 28 and 30 such that there is some clearance between surface 26B and the ends of camshaft lugs 38 and 40 when coupling member 26 is axially assembled to the end of camshaft 12. Alternatively, the axial lengths of the lugs may be such that the ends of lugs 38 and 40 engage surface 26B.

As shown in FIG. 1, the distributor housing 14 and distributor shaft 18 are located horizontally and aligned with the horizontally disposed camshaft.

The embodiments of the invention in which an exclusive property or privilege is claimed are defined as follows:

1. A drive coupling for driving a distributor shaft of an ignition distributor from the camshaft of an internal combustion engine comprising, a coupling member secured to the shaft of the ignition distributor having a pair of circumferentially spaced axially extending first lugs, a metallic spring member secured to said coupling member having a pair of curved spring portions, and a camshaft having a pair of circumferentially spaced axially extending drive lugs, each drive lug having a pair of straight flat surfaces located substantially normal to each other that respectively engage an outer wall of a curved spring portion and a surface formed on a said first axially extending lug of said coupling member.

2. A shaft coupling comprising a first coupling member having a pair of first axially extending circumferentially spaced lugs, each first lug having a generally radially extending first flat surface, the surfaces of the first lugs being substantially parallel, a spring member formed of spring metal material positioned between said first lugs having a base portion fixed to said first coupling member and a pair of spaced axially extending curved spring portions, the outer surface of each curved portion extending generally normal to a respective said first surface of a respective first lug, and a second coupling member having a pair of circumferentially spaced axially extending second lugs, said second lugs each having a third straight flat surface that respectively engages said outer surfaces of said curved portions of said spring member and each second lug having a fourth surface that engages a respective said first surface of said first lugs, the space between said third surfaces being such that said curved spring portions are slightly bowed inwardly when said coupling members are axially assembled, said curved portions of said spring member providing a spring force that is operative to maintain said first and fourth surfaces engaged to thereby provide anti-backlash operation.

3. A drive coupling for driving a first shaft from a second shaft comprising, a coupling member secured to one of said shafts having a pair of circumferentially spaced axially extending first lugs, and a spring member formed of metallic material secured to said coupling member, said spring member having a pair of curved spring portions, said other shaft having a pair of circumferentially spaced axially extending second lugs, each second lug having a pair of straight flat surfaces located substantially normal to each other that respectively engage an outer wall of a said curved spring portion and a surface formed on a said first axially extending lug of said coupling member, the corresponding surfaces of the respective lugs of each pair of lugs are unsymmetrical such that said coupling member and said other shaft must be positioned in only one relative angular relationship before they can be axially assembled.

4. A polarized drive coupling for driving a distributor shaft of an ignition distributor from the camshaft of an internal combustion engine that will not allow coupling of the shafts until the shafts are positioned in one relative angular relationship comprising, a coupling member secured to the shaft of the ignition distributor having a pair of circumferentially spaced axially extending first lugs, a spring member formed of metallic material secured to said coupling member having a pair of curved spring portions, and a camshaft having a pair of circumferentially spaced axially extending drive lugs, each drive lug having a pair of straight flat surfaces located substantially normal to each other that respectively engage an outer wall of a curved spring portion and a surface formed on a said first axially extending lug of said coupling member, the corresponding surfaces of the respective lugs of each pair of lugs are unsymmetrical such that said coupling member and camshaft must be positioned in only one relative angular relationship before they can be axially assembled.

* * * * *